United States Patent
Barber et al.

(10) Patent No.: US 10,831,775 B2
(45) Date of Patent: Nov. 10, 2020

(54) EFFICIENT REPRESENTATION, ACCESS AND MODIFICATION OF VARIABLE LENGTH OBJECTS

(71) Applicant: International Business Machines Corporation, Armonk, CA (US)

(72) Inventors: Ronald J. Barber, San Jose, CA (US); Guy M. Lohman, San Jose, CA (US); Vijayshankar Raman, Sunnyvale, CA (US); Richard S. Sidle, Mountain View, CA (US); Pinar Tozun, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 779 days.

(21) Appl. No.: 15/400,667

(22) Filed: Jan. 6, 2017

(65) Prior Publication Data
US 2018/0196860 A1 Jul. 12, 2018

(51) Int. Cl.
*G06F 16/25* (2019.01)
(52) U.S. Cl.
CPC .................. *G06F 16/258* (2019.01)
(58) Field of Classification Search
CPC .. G06F 16/2379; G06F 16/2386; G06F 16/27; G06F 16/273; G06F 16/275
See application file for complete search history.

(56) References Cited

U.S. PATENT DOCUMENTS

| | | | |
|---|---|---|---|
| 5,369,757 A * | 11/1994 | Spiro | G06F 11/1471 714/19 |
| 6,516,354 B2 | 2/2003 | Cavanaugh | |
| 7,386,663 B2 * | 6/2008 | Cousins | G06F 11/2069 711/114 |
| 7,493,442 B2 | 2/2009 | Wong et al. | |
| 9,542,406 B1 * | 1/2017 | Bourbonnais | G06F 16/1805 |
| 9,547,659 B1 * | 1/2017 | Barber | G06F 16/2379 |
| 2003/0018878 A1 * | 1/2003 | Dorward | G06F 16/113 711/216 |
| 2003/0055833 A1 * | 3/2003 | Chan | G06F 16/40 |
| 2007/0271280 A1 * | 11/2007 | Chandasekaran | G06F 9/542 |
| 2010/0228999 A1 * | 9/2010 | Maheshwari | G06F 21/6218 713/189 |
| 2012/0109895 A1 * | 5/2012 | Zwilling | G06F 11/1471 707/648 |
| 2012/0265931 A1 | 10/2012 | Cheriton | |

(Continued)

OTHER PUBLICATIONS

Pevny, T. et al., "Converting String Data to Fixed Length Numerical Vectors", Cisco Systems, Inc., Mar. 16, 2016, pp. 1-9, ip.com, United States.

(Continued)

*Primary Examiner* — William Spieler
(74) *Attorney, Agent, or Firm* — Sherman IP LLP; Kenneth L. Sherman; Steven Laut

(57) ABSTRACT

One embodiment provides a method for efficient representation, access and modification of variable length data objects including converting, by a processor, all object updates into appends. The processor divides each object update into bounded size tokens. The tokens are stored normalized as an anchor and a linked list of fragments, the anchor having a pointer to a linked list of fragments. A fragment comprises a contiguous list of tokens that correspond to the appends.

20 Claims, 9 Drawing Sheets

(56) References Cited

U.S. PATENT DOCUMENTS

| | | | |
|---|---|---|---|
| 2013/0124559 A1* | 5/2013 | Hansen | G06F 11/2097 |
| | | | 707/769 |
| 2015/0278281 A1* | 10/2015 | Zhang | G06F 16/2322 |
| | | | 707/703 |
| 2016/0162207 A1* | 6/2016 | Sharma | G06F 16/2255 |
| | | | 711/162 |
| 2017/0011062 A1* | 1/2017 | Zaveri | G06F 16/2379 |
| 2018/0107419 A1* | 4/2018 | Sachdev | G06F 3/065 |
| 2018/0113767 A1* | 4/2018 | Pogosyan | G06F 16/27 |
| 2018/0165324 A1* | 6/2018 | Krishnaswamy | G06F 11/00 |
| 2018/0165345 A1* | 6/2018 | Nomura | G06F 11/1453 |

OTHER PUBLICATIONS

Anonymously, "A system and method for generating tamper-proof tokens using a secret mixing blueprint and random salt for remotely controlling access to resources in a stateless resource server", Jan. 6, 2016, pp. 1-9, ip.com, United States.

Mell, P., et al., "The NIST Definition of Cloud Computing", National Institute of Standards and Technology Special Publication 800-145, Sep. 2011, pp. 1-7, U.S. Department of Commerce, United States.

* cited by examiner

EFFICIENT REPRESENTATION, ACCESS AND MODIFICATION OF VARIABLE LENGTH OBJECTS

BACKGROUND

Many objects (e.g., j son objects, profiles for mobile applications, text fields, sequences, java objects (spark), arrays, etc.) used in data analysis are variable length, with little predictability about length, and growth over time. Information management systems traditionally handle these poorly, such as use of inefficient get and put methods (access and modification).

In traditional systems varchars are implemented less efficiently than fixed length types. Further, the client-server interface for a get-put interaction introduces significant overheads. In one example, for flexible lengths, structured query language (SQL) systems need an upper bound specified up front, and have trouble with very large objects. Efficiency-wise, storing a mostly small string in a larger varchar causes big slowdown (e.g., growth without repeated replacing). Often, applications grow such objects gradually. But in many systems, a small modification to a large object results in a new copy, causing fragmentation.

SUMMARY

Embodiments relate to efficient representation, access and modification of variable length data objects. One embodiment provides a method for efficient representation, access and modification of variable length data objects including converting, by a processor, all object updates into appends. The processor divides each object update into bounded size tokens. The tokens are stored normalized as an anchor and a linked list of fragments, the anchor having a pointer to the linked list of fragments. A fragment comprises a contiguous list of tokens that correspond to the appends.

These and other features, aspects and advantages of the present invention will become understood with reference to the following description, appended claims and accompanying figures.

DETAILED DESCRIPTION

Figure 1:
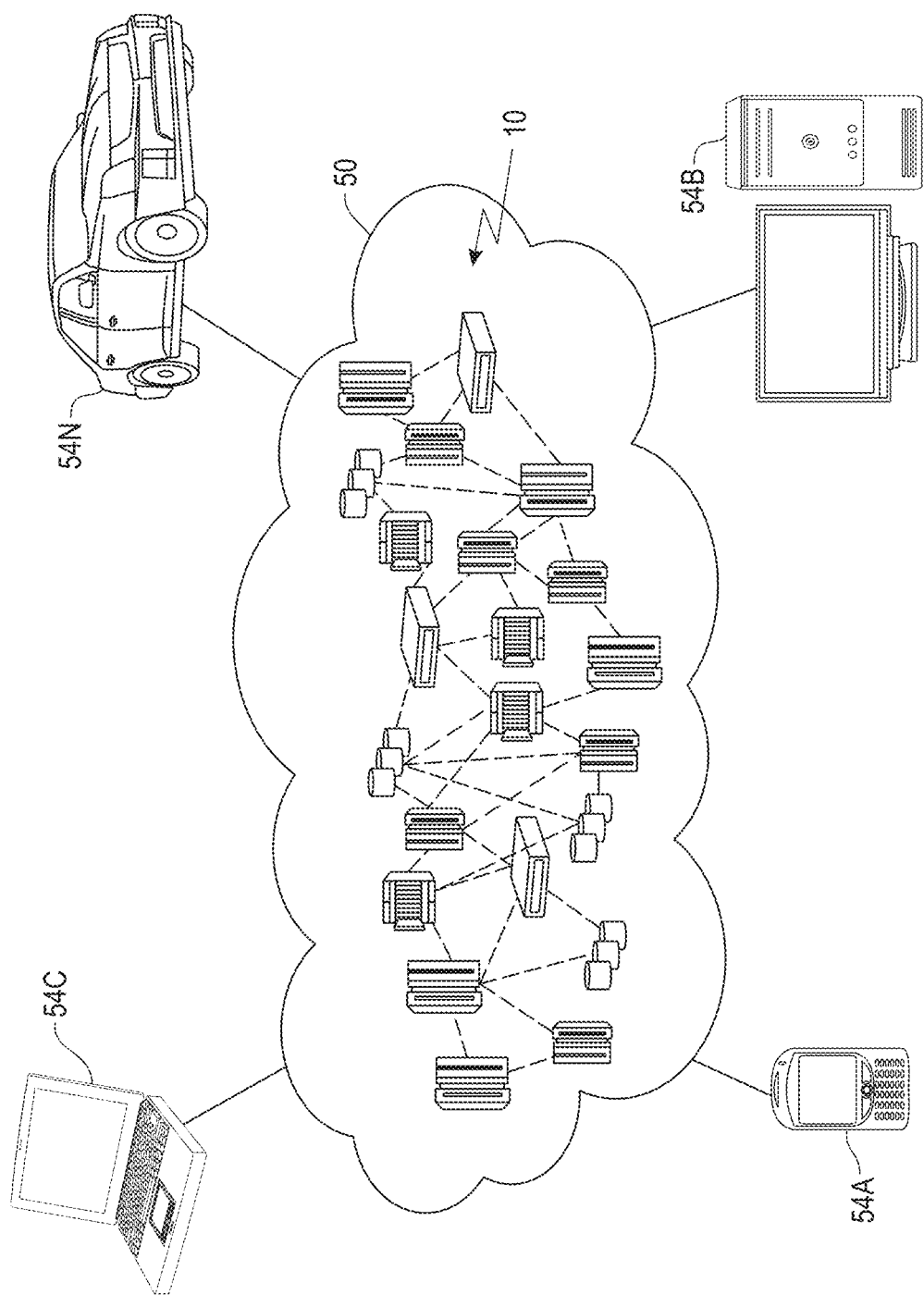
FIG. 1 depicts a cloud computing environment, according to an embodiment.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

It is understood in advance that although this disclosure includes a detailed description of cloud computing, implementation of the teachings recited herein are not limited to a cloud computing environment. Rather, embodiments of the present invention are capable of being implemented in conjunction with any other type of computing environment now known or later developed.

One or more embodiments provide for efficient representation, access and modification of variable length data objects. One embodiment provides efficient representation, access and modification of variable length data objects including converting, by a processor, all object updates into appends. The processor divides each object update into bounded size tokens. The tokens are stored normalized as an anchor and a linked list of fragments, the anchor having a pointer to the linked list of fragments. A fragment comprises a contiguous list of tokens that correspond to the appends.

Cloud computing is a model of service delivery for enabling convenient, on-demand network access to a shared pool of configurable computing resources (e.g., networks, network bandwidth, servers, processing, memory, storage, applications, virtual machines (VMs), and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed and automatically, without requiring human interaction with the service's provider.

Broad network access: capabilities are available over a network and accessed through standard mechanisms that promote use by heterogeneous, thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or data center).

Rapid elasticity: capabilities can be rapidly and elastically provisioned and, in some cases, automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active consumer accounts). Resource usage can be monitored, controlled, and reported, thereby providing transparency for both the provider and consumer of the utilized service.

Service Models are as follows:

Software as a Service (SaaS): the capability provided to the consumer is the ability to use the provider's applications running on a cloud infrastructure. The applications are accessible from various client devices through a thin client interface, such as a web browser (e.g., web-based email). The consumer does not manage or control the underlying cloud infrastructure including network, servers, operating systems, storage, or even individual application capabilities, with the possible exception of limited consumer-specific application configuration settings.

Platform as a Service (PaaS): the capability provided to the consumer is the ability to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application-hosting environment configurations.

Infrastructure as a Service (IaaS): the capability provided to the consumer is the ability to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load balancing between clouds).

A cloud computing environment is a service oriented with a focus on statelessness, low coupling, modularity, and semantic interoperability. At the heart of cloud computing is an infrastructure comprising a network of interconnected nodes.

Referring now to FIG. 1, an illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as private, community, public, or hybrid clouds as described hereinabove, or a combination thereof. This allows the cloud computing environment 50 to offer infrastructure, platforms, and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 2:
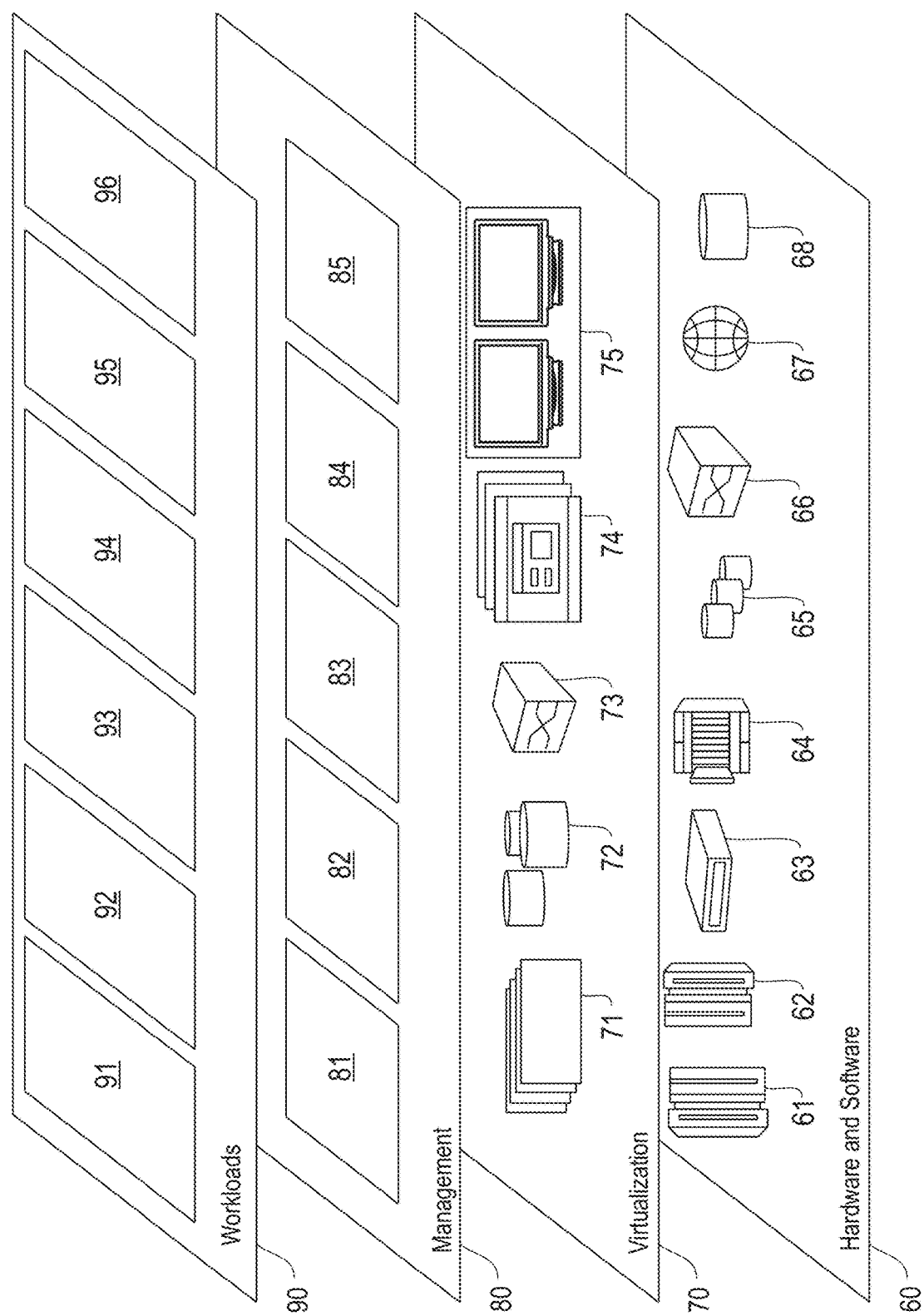
FIG. 2 depicts a set of abstraction model layers, according to an embodiment.

Referring now to FIG. 2, a set of functional abstraction layers provided by the cloud computing environment 50 (FIG. 1) is shown. It should be understood in advance that the components, layers, and functions shown in FIG. 2 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, a management layer 80 may provide the functions described below. Resource provisioning 81 provides dynamic procurement of computing resources and other resources that are utilized to perform tasks within the cloud computing environment. Metering and pricing 82 provide cost tracking as resources are utilized within the cloud computing environment and billing or invoicing for consumption of these resources. In one example, these resources may comprise application software licenses. Security provides identity verification for cloud consumers and tasks as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and efficient representation, access and modification of variable length data objects processing 96. As mentioned above, all of the foregoing examples described with respect to FIG. 2 are illustrative only, and the invention is not limited to these examples.

It is understood all functions of one or more embodiments as described herein may be typically performed by the processing system 300 (FIG. 3) or the autonomous cloud environment 410 (FIG. 4), which can be tangibly embodied as hardware processors and with modules of program code.

However, this need not be the case for non-real-time processing. Rather, for non-real-time processing the functionality recited herein could be carried out/implemented and/or enabled by any of the layers 60, 70, 80 and 90 shown in FIG. 2.

It is reiterated that although this disclosure includes a detailed description on cloud computing, implementation of the teachings recited herein are not limited to a cloud computing environment. Rather, the embodiments of the present invention may be implemented with any type of clustered computing environment now known or later developed.

Figure 3:
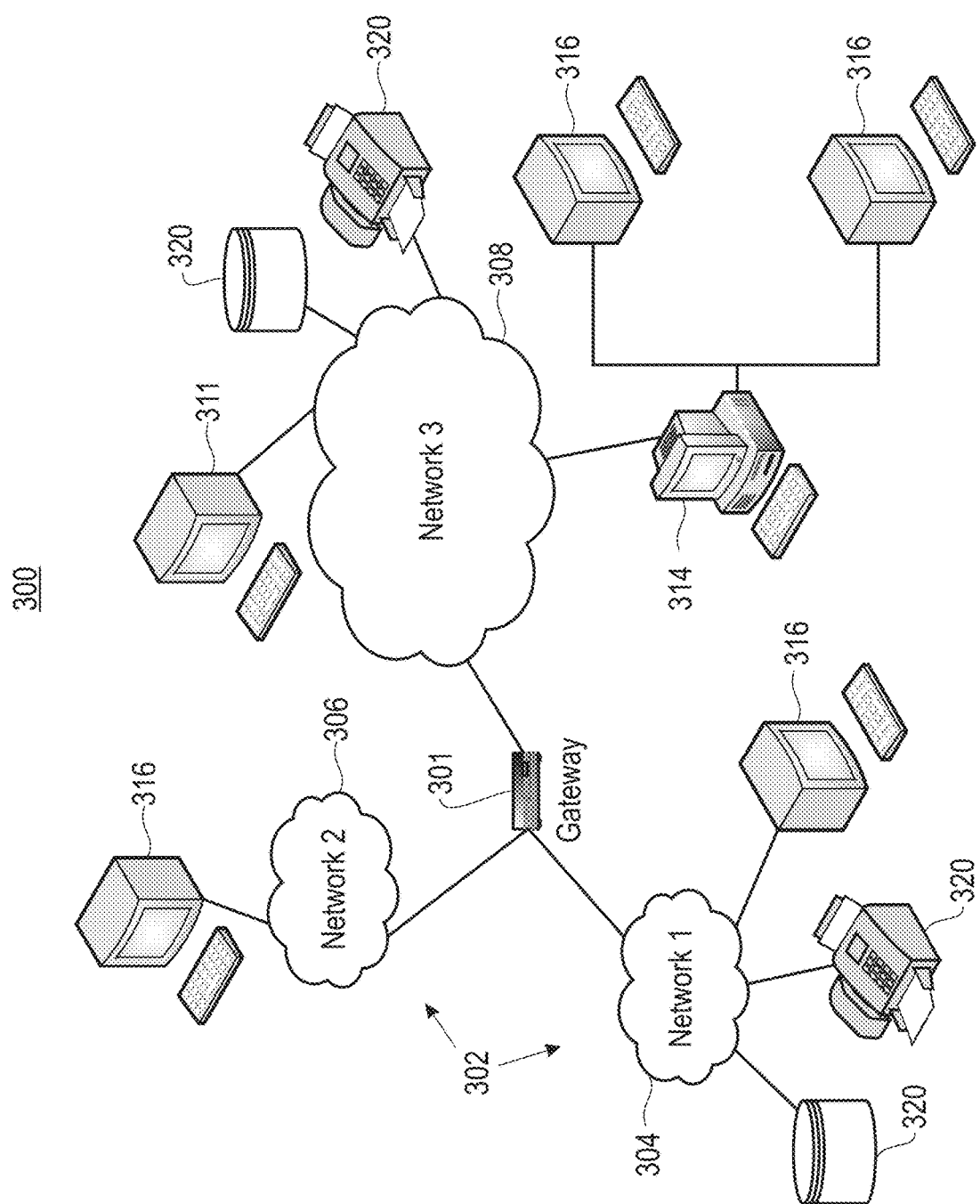
FIG. 3 is a network architecture for efficient representation, access and modification of variable length data objects, according to an embodiment.

FIG. 3 illustrates a network architecture 300, in accordance with one embodiment. As shown in FIG. 3, a plurality of remote networks 302 are provided, including a first remote network 304 and a second remote network 306. A gateway 301 may be coupled between the remote networks 302 and a proximate network 308. In the context of the present network architecture 300, the networks 304, 306 may each take any form including, but not limited to, a LAN, a WAN, such as the Internet, public switched telephone network (PSTN), internal telephone network, etc.

In use, the gateway 301 serves as an entrance point from the remote networks 302 to the proximate network 308. As such, the gateway 301 may function as a router, which is capable of directing a given packet of data that arrives at the gateway 301, and a switch, which furnishes the actual path in and out of the gateway 301 for a given packet.

Further included is at least one data server 314 coupled to the proximate network 308, which is accessible from the remote networks 302 via the gateway 301. It should be noted that the data server(s) 314 may include any type of computing device/groupware. Coupled to each data server 314 is a plurality of user devices 316. Such user devices 316 may include a desktop computer, laptop computer, handheld computer, printer, and/or any other type of logic-containing device. It should be noted that a user device 311 may also be directly coupled to any of the networks in some embodiments.

A peripheral 320 or series of peripherals 320, e.g., facsimile machines, printers, scanners, hard disk drives, networked and/or local storage units or systems, etc., may be coupled to one or more of the networks 304, 306, 308. It should be noted that databases and/or additional components may be utilized with, or integrated into, any type of network element coupled to the networks 304, 306, 308. In the context of the present description, a network element may refer to any component of a network.

According to some approaches, methods and systems described herein may be implemented with and/or on virtual systems and/or systems, which emulate one or more other systems, such as a UNIX system that emulates an IBM z/OS environment, a UNIX system that virtually hosts a MICROSOFT WINDOWS environment, a MICROSOFT WINDOWS system that emulates an IBM z/OS environment, etc. This virtualization and/or emulation may be implemented through the use of VMWARE software in some embodiments.

Figure 4:
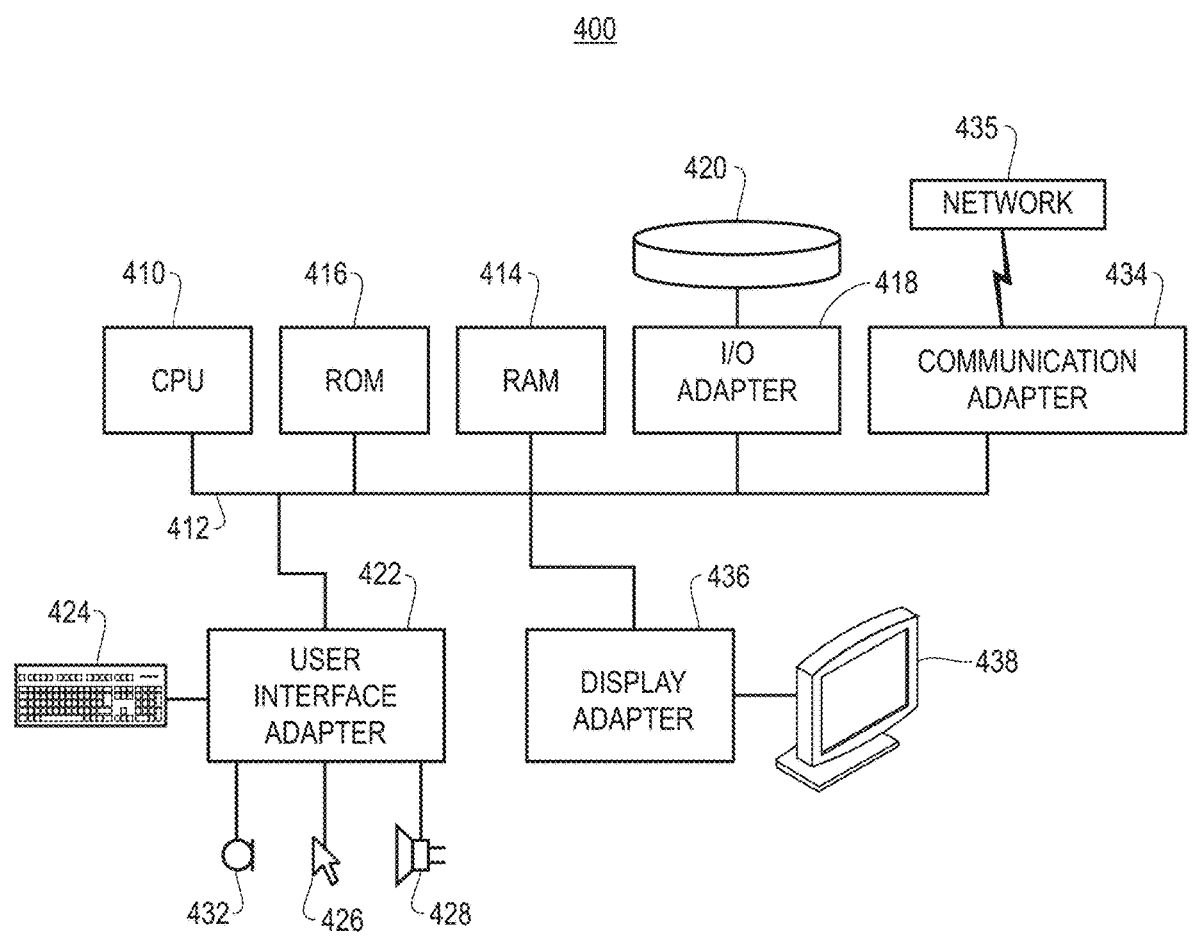
FIG. 4 shows a representative hardware environment that may be associated with the servers and/or clients of FIG. 1, according to an embodiment.

FIG. 4 shows a representative hardware system 400 environment associated with a user device 416 and/or server 314 of FIG. 3, in accordance with one embodiment. In one example, a hardware configuration includes a workstation having a central processing unit 410, such as a microprocessor, and a number of other units interconnected via a system bus 412. The workstation shown in FIG. 4 may include a Random Access Memory (RAM) 414, Read Only Memory (ROM) 416, an I/O adapter 418 for connecting peripheral devices, such as disk storage units 420 to the bus 412, a user interface adapter 422 for connecting a keyboard 424, a mouse 426, a speaker 428, a microphone 432, and/or other user interface devices, such as a touch screen, a digital camera (not shown), etc., to the bus 412, communication adapter 434 for connecting the workstation to a communication network 435 (e.g., a data processing network) and a display adapter 436 for connecting the bus 412 to a display device 438.

In one example, the workstation may have resident thereon an operating system, such as the MICROSOFT WINDOWS Operating System (OS), a MAC OS, a UNIX OS, etc. In one embodiment, the system 400 employs a POSIX® based file system. It will be appreciated that other examples may also be implemented on platforms and operating systems other than those mentioned. Such other examples may include operating systems written using JAVA, XML, C, and/or C++ language, or other programming languages, along with an object oriented programming methodology. Object oriented programming (OOP), which has become increasingly used to develop complex applications, may also be used.

Figure 5:
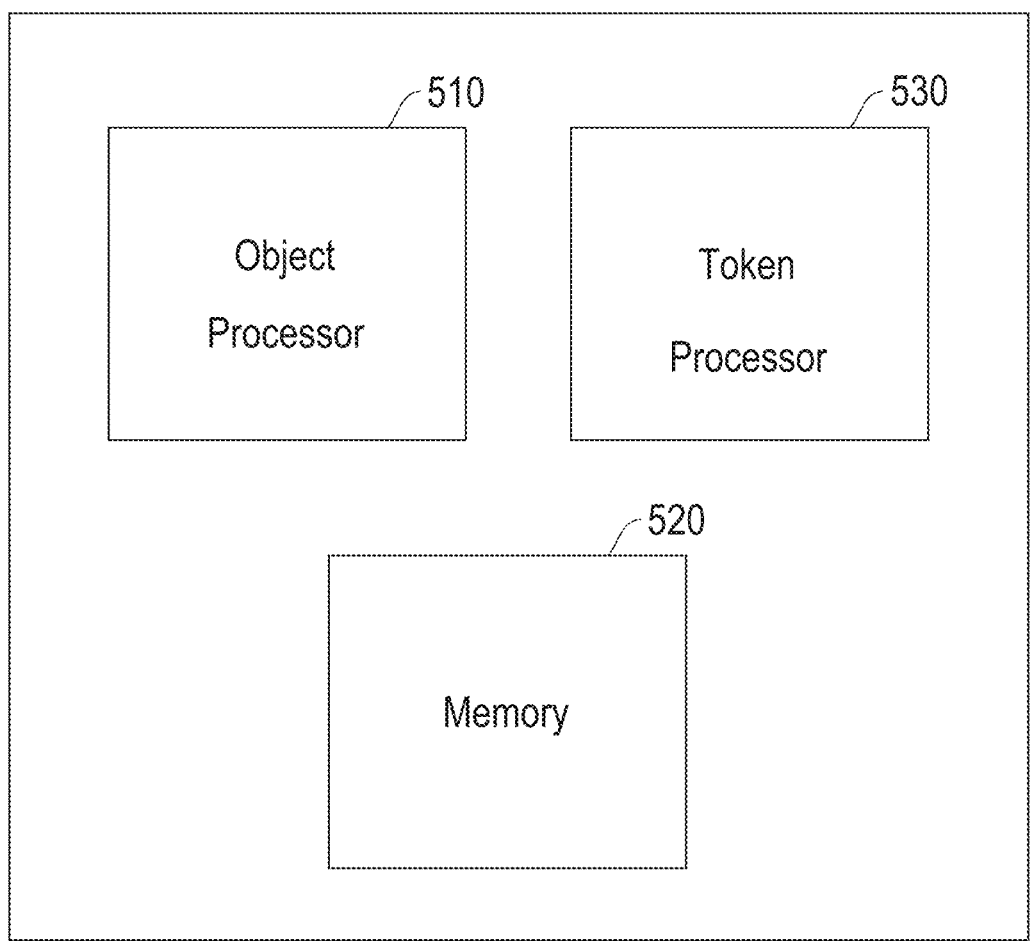
FIG. 5 is a block diagram illustrating processors for efficient representation, access and modification of variable length data objects, according to an embodiment.

FIG. 5 is a block diagram illustrating processors for efficient representation, access and modification of variable length data objects, according to an embodiment. Node 500 includes an object processor 510, memory 520 and a token processor 530. The memory 520 may be implemented to store instructions and data, where the instructions are executed by the object processor 510 and the token processor 530. In one example, the object processor 510 provides conversion of all object updates into appends. An append on a singly linked provides a queue with First-In-First-Out (FIFO) behavior. Processing requests in FIFO order provides predictable latency. On a doubly linked list which allows O(1) out-of-order removal given a pointer or reference to the node may be used to control order.

In one embodiment, the object processor 510 provides modification by insert (or delete, or edit) of fragments into an object by converting into an append of the inserted fragment (or a difference between the current fragment and its edited value), plus an identifier of the insert position and an identifier as to whether it is an insert or delete or edit. In one example, for a nested object (e.g., JSON (JavaScript Object Notation)) this identifier may be a Dewey decimal reference. In another example, for a general object the identifier may be a byte offset. In one embodiment, the object processor performs modifications by delete operations, handled similar to inserts (soft deletes). For general modification, the object processor 510 forms a concise representation of the edit (byte range and nature of edit within that), either given by an executing application or computed.

In one embodiment, the token processor 530 divides each object into bounded size tokens, and stores the object in the memory 520 normalized: as an anchor and a list of fragments. In one embodiment, an anchor has a pointer to a linked list of fragments, where a fragment is a contiguous list of tokens. It should be noted that the tokens correspond to the appends produced by the object processor. In one example a single append is represented as a single fragment, although the token processor 530 may also buffer up multiple appends to a frequently modified object to reduce the amount of fragmentation. The anchor is the externally published location of that object (for example, a column holding that object, in case of a columnar storage system), and now has a fixed length. In one example, the linked list is stored in the memory 520 in reverse-chronological order of updates. This helps in two ways. First, a client may easily access a delta of the object (from the time it last accessed that object). Secondly, a put operation may perform a modification to an object, without forming a new copy. In one embodiment, since the tokens are bounded in size, they are easily represented, for example as a column in a table. The pointers in the linked list are record identifiers within that table.

For isolation for concurrent readers, in one embodiment the token processor 530 tags each fragment with a transaction identifier so that concurrent readers may skip fragments from incomplete (non-committed) modifications. For applications that need multi-row transactions (satisfying traditional ACID (atomicity, consistency, isolation and durability) properties), the transaction identifier is converted to a commit timestamp after the commit in order to support as-of and snapshot isolation queries. For applications that need only single-row transactions (key-value stores), the transaction identifier is a timestamp—and no conversion is necessary.

In one embodiment, for efficient access to frequently accessed objects, the object processor 510 maintains a cache of complete (i.e., non-fragmented) objects. This cache is also used for running user-defined functions and other such specialized logic on the objects. To optimize the client-server interaction, variable sized objects are not returned to the client via a traditional ODBC (open database connectivity)/JDBC (Java database connectivity) interface (or other synchronous interface). Instead, in one embodiment two kinds of get requests are supported: direct gets and applying functions. For direct gets, a get request passes along a port on which the client is listening. The server asynchronously sends the result to the client via this port. For applying functions, functions that produce bounded-size results are applied directly on the object and results returned synchronously via a traditional (e.g., SQL) interface. To perform the function on fragmented objects, either a temporary copy is formed, or an object.getByteAt( ) interface is applied to the function implementation. For objects from known domains such as text, the tokenization is performed by the token processor 530 at word or phrase boundaries. This helps with both compression and keyword searches. For example, the column containing the tokens is naturally dictionary compressed, yielding a fixed length column of codes. Keyword searches can be done efficiently on the dictionary codes.

Figure 6:
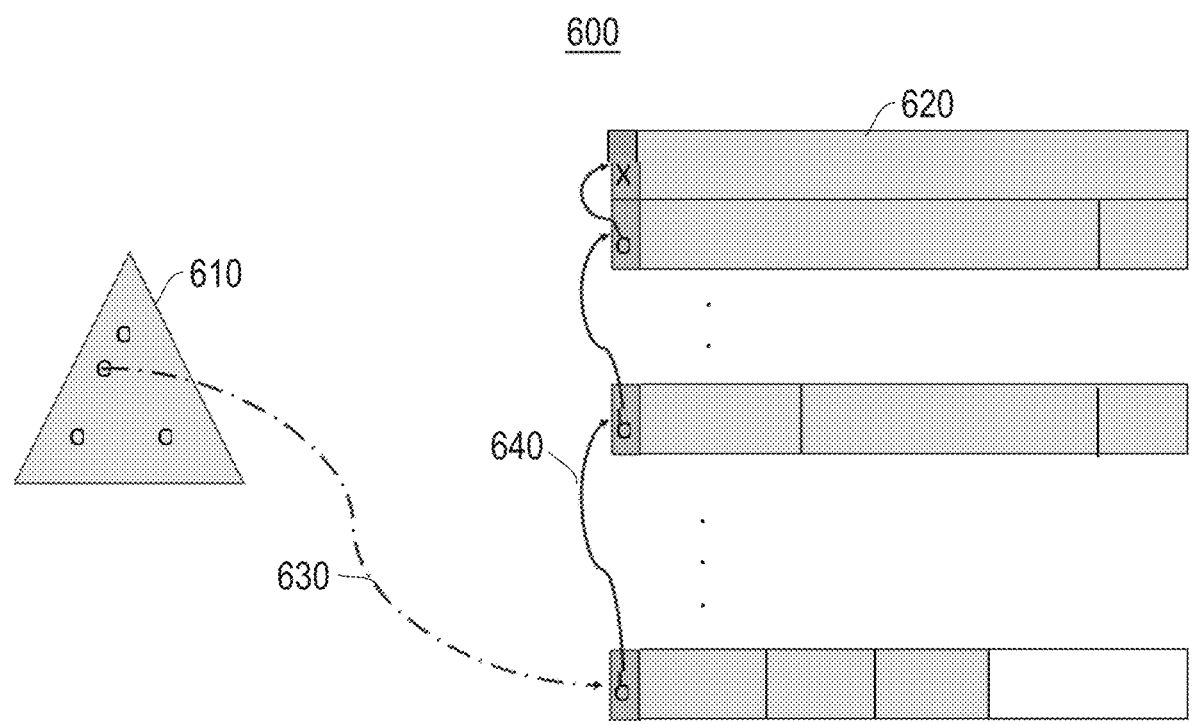
FIG. 6 illustrates an example layout of variable length objects stored in slotted pages, according to an embodiment.

FIG. 6 illustrates an example layout 600 of variable length objects stored in fragments 620, according to an embodiment. As shown, the object index 610 contains object anchors (either directly embedded in the index, or pointed to from it). These anchors include fragment pointers 630 that point to the last fragment of the corresponding object—as shown in the figure, these fragments can be stored in pages (with one or more fragments per page). Each fragment 620 contains one or more deltas for an object (shown as light-gray rectangles). Each fragment also has backward pointers 640 to prior deltas for that object. Fragments will typically be fixed length, and correspond to a unit of memory allocation by a memory processor such as shown in memory 520, or to a slotted page.

Figure 7:
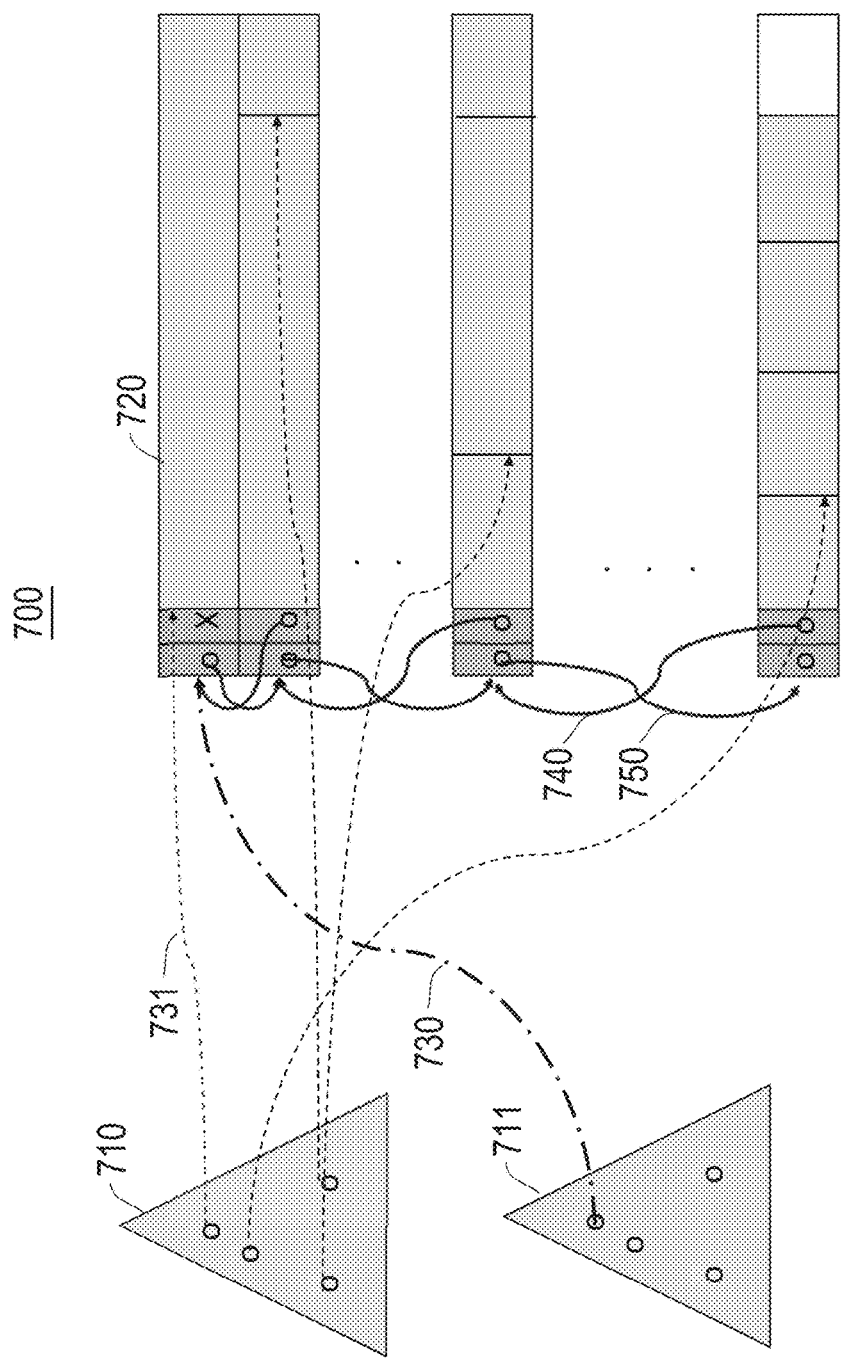
FIG. 7 is an example layout of variable length objects stored in doubly linked slotted pages, according to an embodiment.

FIG. 7 is an example layout 700 of variable length objects stored in doubly linked fragments 720, according to an embodiment. As shown, the doubly linked fragments 720 contain a forward pointer 750 and a backward pointer 740 (shown in dark gray) and one or more deltas (shown as light gray rectangles). As shown, the object index 711 includes object anchors (either directly embedded in the index, or pointed to from it). These anchors include fragment pointers 730 that point to the first fragment of an object. Using these anchors one can reconstruct the desired version of the full object by traversing the linked list in forward direction. The optional content index 710 includes pointers 731 that point to specific deltas of an object (not necessarily the first): this index maps object content to specific versions of an object.

Figure 8:
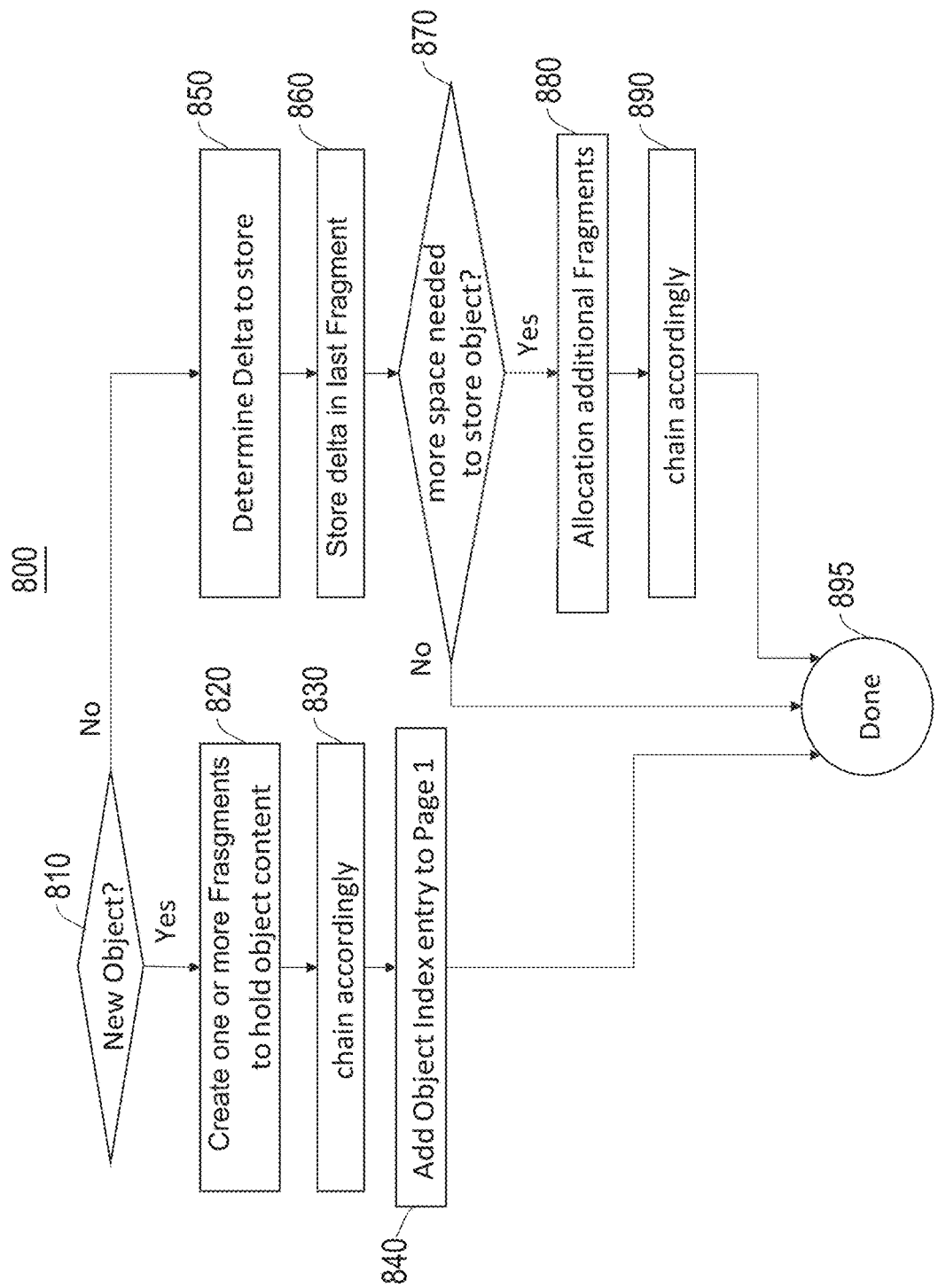
FIG. 8 is a flow diagram for an object store request, according to an embodiment.

FIG. 8 is a flow diagram 800 for an object store request, according to an embodiment. In one embodiment, the flow begins in block 810 where it is determined (e.g., by the object processor 510, FIG. 5) whether a new object is being processed. If a new object is being processed the flow proceeds to block 820, otherwise the flow proceeds to block 850. In block 820, one or more fragments are created (e.g., in the memory 520, FIG. 5) to hold object content. In block 830, the fragments are chained accordingly—with either backward pointers alone, or with both backward and forward pointers. In block 840, an object index entry is added containing an anchor for that object, pointing to its first fragment. The flow 800 then proceeds to block 895 and completes.

In one embodiment, in block 850 a delta is determined to be stored. In block 860, the delta is attempted to be stored in the last fragment for that object. In block 870, it is determined whether more space (beyond what is available free on that fragment) is needed to store the object. If it is determined that more space is needed to store the object, the flow proceeds to block 880, otherwise the flow proceeds to block 895 and completes.

In one embodiment, in block 880 additional fragments are allocated to memory. In block 890, the additional fragments are chained accordingly. The flow then proceeds to block 895 to complete.

Figure 9:
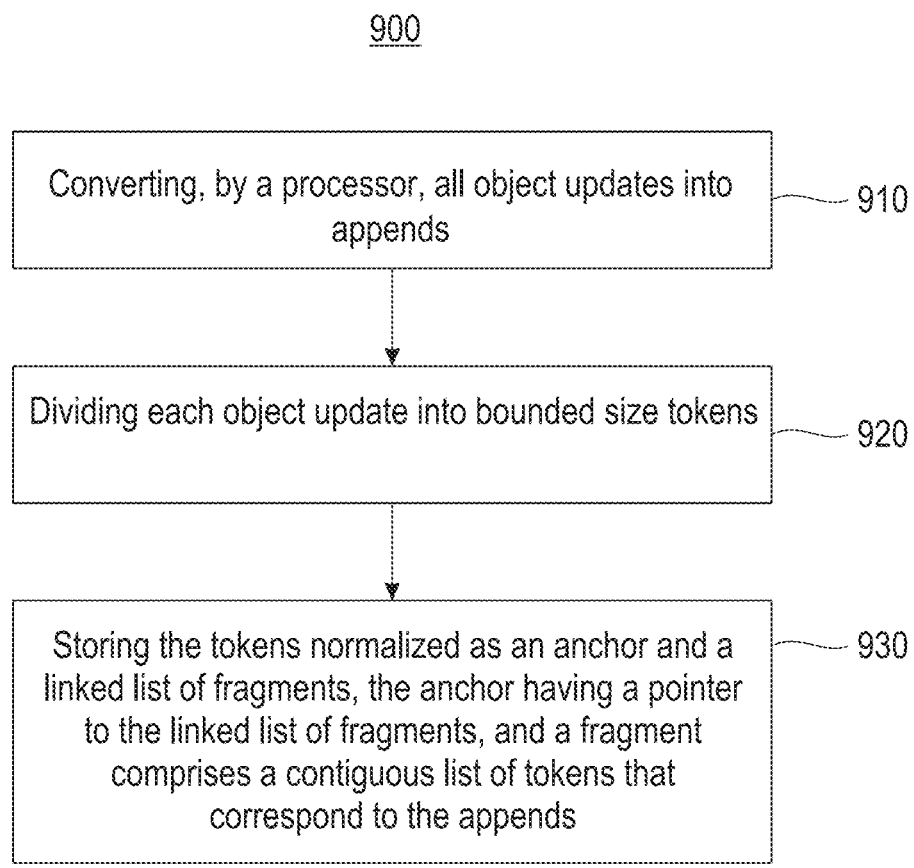
FIG. 9 illustrates a block diagram for a process for efficient representation, access and modification of variable length data objects, according to one embodiment.

FIG. 9 illustrates a block diagram for a process 900 for efficient representation, access and modification of variable length data objects, according to one embodiment. In block 910 process 900 includes converting, by a processor (e.g., the object processor 510, FIG. 5), all object updates into appends. In block 920, process 900 includes dividing, by the processor, the append corresponding each object update into bounded size tokens. In block 930, process 900 includes storing the tokens normalized as an anchor and a linked list of fragments. The anchor having a pointer to the linked list of fragments. A fragment comprises a contiguous list of one or more tokens that correspond to the appends.

In one embodiment, process 900 may provide that updates that insert or edit portions within the object are converted into an append of the portion, and providing an identifier of the insert or edit position. In one embodiment, the identifier is a Dewey decimal reference or a byte offset. The linked list is stored in memory (e.g., memory 520, FIG. 5) in reverse-chronological order of updates. In one embodiment, process 900 may provide that the anchor points to a suitable fragment for an object and the linked list is a doubly linked list with forward and backward pointers, and the suitable fragment is the first fragment or a fragment corresponding to a desired content in the object.

In one embodiment, process 900 may further include tagging each fragment with a transaction identifier so that concurrent readers skip fragments from non-committed modifications. Process 900 may additionally include converting the transaction identifier to a commit timestamp after a commit operation to support as-of and snapshot isolation queries. In one embodiment, process 900 may provide that for applications that need single-row transactions, the transaction identifier is a timestamp and no conversion is necessary.

In one embodiment, process 900 may further include maintaining a cache of non-fragmented objects, and using the cache for running user-defined functions and specialized logic on the objects.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a non-volatile memory (NVRAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

References in the claims to an element in the singular is not intended to mean "one and only" unless explicitly so stated, but rather "one or more." All structural and functional equivalents to the elements of the above-described exemplary embodiment that are currently known or later come to be known to those of ordinary skill in the art are intended to be encompassed by the present claims. No claim element herein is to be construed under the provisions of 35 U.S.C. section 112, sixth paragraph, unless the element is expressly recited using the phrase "means for" or "step for."

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method for efficient representation, access and modification of variable length data objects comprising:
   converting, by a processor, all updates of fragments within an object into appends of the fragments;
   dividing, by the processor, each append into bounded size tokens; and
   storing, for each object, the tokens normalized as an anchor and a linked list of fragments, the anchor being contained in an object index, the anchor having a fragment pointer to the linked list of fragments, a fragment comprises a contiguous list of tokens that correspond to the appends, and a single append is represented as a single fragment.

2. The method of claim 1, wherein updates that insert or edit fragments within the object are converted into an append of the fragment, providing an identifier of the insert or edit position, the anchor is an externally published location of the object.

3. The method of claim 2, wherein the identifier comprises one of a Dewey decimal reference to a nested structure or a byte offset, the linked list is stored in memory in an order of updates, and the anchor has a fixed length.

4. The method of claim 1, further comprising:
   reconstructing, using the anchor, a version of a full object by traversing the linked list in a forward direction;
   wherein the anchor points to a particular fragment for an object and the linked list is a doubly linked list with forward and backward pointers and one or more deltas from a time of last access for the object, and the particular fragment is the first fragment or a fragment corresponding to a desired content in the object.

5. The method of claim 1, further comprising:
   mapping object content to specific versions of an object using a content index; and
   tagging each fragment with a transaction identifier so that concurrent readers skip fragments from non-committed modifications;
   wherein:
   the fragment pointer points to a last fragment of a corresponding object;
   each fragment contains a delta from a time of last access for the corresponding object; and
   the content index includes pointers that point to specific deltas of an object.

6. The method of claim 5, further comprising:
   using a commit timestamp for the transaction identifier after a commit operation to support as-of and snapshot isolation queries;
   wherein each fragment further includes a backward pointer to prior deltas for the corresponding object.

7. The method of claim 1, wherein for applications that need single-row transactions, the transaction identifier is a timestamp.

8. The method of claim 1, further comprising:
   maintaining a cache of complete objects; and
   using the cache for running user-defined functions and specialized logic on the objects.

9. A computer program product for efficient representation, access and modification of variable length data objects, the computer program product comprising a computer readable storage medium having program instructions embodied therewith, the program instructions executable by a processor to cause the processor to:
   convert, by a processor, all updates of fragments within an object into appends of the fragments;
   divide, by the processor, each append into bounded size tokens; and
   store, for each object, by the processor, the tokens normalized as an anchor and a linked list of fragments, the anchor being contained in an object index, the anchor having a fragment pointer to the linked list of fragments, a fragment comprises a contiguous list of tokens that correspond to the appends, and a single append is represented as a single fragment.

10. The computer program product of claim 9, wherein the fragments are inserted into the object by the converting into an append of the fragment, providing an identifier of an insert position, the anchor is an externally published location of the object.

11. The computer program product of claim 10, wherein the identifier comprises one of a Dewey decimal reference or a byte offset, the linked list is stored in memory in an order of updates, and the anchor has a fixed length.

12. The computer program product of claim 9, further comprising program instructions executable by the processor to cause the processor to:
    reconstruct, by the processor, using the anchor, a version of a full object by traversing the linked list in a forward direction;
    wherein the anchor points to a particular fragment for an object and the linked list is a doubly linked list with forward and backward pointers and one or more deltas from a time of last access for the object, and the particular fragment is the first fragment or a fragment corresponding to a desired content in the object.

13. The computer program product of claim 10, further comprising program instructions executable by the processor to cause the processor to:
    map, by the processor, object content to specific versions of an object using a content index; and
    tag, by the processor, each fragment with a transaction identifier so that concurrent readers skip fragments from non-committed modifications;
    wherein:

the fragment pointer points to a last fragment of a corresponding object;

each fragment contains a delta from a time of last access for the corresponding object; and the content index includes pointers that point to specific deltas of an object.

14. The computer program product of claim 13, further comprising program instructions executable by the processor to cause the processor to:

using a commit timestamp for the transaction identifier after a commit operation to support as-of and snapshot isolation queries;

wherein each fragment further includes a backward pointer to prior deltas for the corresponding object.

15. The computer program product of claim 9, wherein for applications that need single-row transactions, the transaction identifier is a timestamp.

16. The computer program product of claim 9, further comprising program instructions executable by the processor to cause the processor to:

maintain a cache of complete objects; and use the cache for running user-defined functions and specialized logic on the objects.

17. An apparatus comprising:

a memory configured to store instructions; and a processor configured to execute the instructions to convert all updates of fragments within an object into appends of the fragments, divide each append into bounded size tokens, and to store, for each object, the tokens normalized as an anchor and a linked list of fragments, wherein the anchor being contained in an object index, the anchor having a fragment pointer to the linked list of fragments, a fragment comprises a contiguous list of tokens that correspond to the appends, and a single append is represented as a single fragment.

18. The apparatus of claim 17, wherein:

the processor is further configured to execute the instructions to reconstruct, using the anchor, a version of a full object by traversing the linked list in a forward direction;

the fragments are inserted into the object by the converting into an append of the fragment, and providing an identifier of an insert position;

the identifier comprises one of a Dewey decimal reference or a byte offset, and the linked list is stored in memory in an order of updates;

the anchor points to a particular fragment for an object and the linked list is a doubly linked list with forward and backward pointers and one or more deltas from a time of last access for the object;

the particular fragment is the first fragment or a fragment corresponding to a desired content in the object; and the anchor is an externally published location of the object.

19. The apparatus of claim 17, wherein the processor is further configured to execute the instructions to:

map object content to specific versions of an object using a content index;

tag each fragment with a transaction identifier so that concurrent readers skip fragments from non-committed modifications, and use a commit timestamp for the transaction identifier after a commit operation to support as-of and snapshot isolation queries, wherein:

for applications that need single-row transactions, the transaction identifier is a timestamp, and the anchor has a fixed length;

the fragment pointer points to a last fragment of a corresponding object;

each fragment contains a delta from a time of last access for the corresponding object and a backward pointer to prior deltas for the corresponding object and the content index includes pointers that point to specific deltas of an object.

20. The apparatus of claim 17, wherein the processor is further configured to execute the instructions to maintain a cache of complete objects, and use the cache for running user-defined functions and specialized logic on the objects.

* * * * *